United States Patent
Loessel et al.

(10) Patent No.: US 10,851,208 B2
(45) Date of Patent: Dec. 1, 2020

(54) METHOD FOR PRODUCING SIOH-FUNCTIONAL POLYSILOXANES

(71) Applicant: WACKER CHEMIE AG, Munich (DE)

(72) Inventors: Georg Loessel, Emmerting (DE); Manfred Meisenberger, Hochburg (AT)

(73) Assignee: WACKER CHEMIE AG, Munich (DE)

( * ) Notice: Subject to any disclaimer, the term of this patent is extended or adjusted under 35 U.S.C. 154(b) by 3 days.

(21) Appl. No.: 16/349,085

(22) PCT Filed: Nov. 10, 2016

(86) PCT No.: PCT/EP2016/077221
§ 371 (c)(1),
(2) Date: May 10, 2019

(87) PCT Pub. No.: WO2018/086690
PCT Pub. Date: May 17, 2018

(65) Prior Publication Data
US 2019/0270851 A1    Sep. 5, 2019

(51) Int. Cl.
*C08G 77/16*    (2006.01)
*C08G 77/06*    (2006.01)

(52) U.S. Cl.
CPC ............ *C08G 77/06* (2013.01); *C08G 77/16* (2013.01)

(58) Field of Classification Search
CPC ................. C08G 77/06; C08G 77/16
See application file for complete search history.

(56) References Cited

U.S. PATENT DOCUMENTS

| | | | |
|---|---|---|---|
| 3,489,782 A | 1/1970 | Pruvost et al. | |
| 3,677,872 A * | 7/1972 | Antonen | C08G 77/16 442/180 |
| 5,198,518 A * | 3/1993 | Yamamoto | C08G 77/06 528/10 |
| 6,069,220 A | 5/2000 | Hoffmann et al. | |
| 9,988,498 B2 | 6/2018 | Loessel et al. | |

FOREIGN PATENT DOCUMENTS

| | | |
|---|---|---|
| DE | 19800023 A1 | 7/1999 |
| DE | 102013212980 A1 | 1/2015 |

* cited by examiner

*Primary Examiner* — Marc S Zimmer
(74) *Attorney, Agent, or Firm* — Brooks Kushman P.C.

(57) ABSTRACT

High hydroxyl-content organopolysiloxanes of low molecular weight are prepared in a continuous process by metering in alkoxysilanes and chlorosilanes in a weight proportion of 60:40 or more to a reaction mixture containing water and non-polar solvent, and continuously removing an organic phase containing organopolysiloxanes from the reaction mixture.

7 Claims, No Drawings

METHOD FOR PRODUCING SIOH-FUNCTIONAL POLYSILOXANES

CROSS REFERENCE TO RELATED APPLICATIONS

This application is the U.S. National Phase of PCT Appln. No. PCT/EP2016/077221 filed Nov. 10, 2016, the disclosure of which is incorporated in its entirety by reference herein.

BACKGROUND OF THE INVENTION

1. Field of the Invention

The invention relates to a continuous process for producing SiOH-functional polysiloxanes with low molecular weight.

2. Description of the Related Art

DE 102013212980 describes SiOH-functional polyphenylsiloxanes that can be produced by a continuous process in which, inter alia, chlorosilanes in a proportion by weight of 95% to 60% and alkoxysilanes in a proportion by weight of 5% to 40%, based on the sum total of chlorosilanes and alkoxysilanes, are metered into the reaction apparatus in parallel with water and a non-polar solvent.

The years of technical experience handling these polysiloxane resins show that high molecular weights, Mw>3000 g/mol, are unsuitable for surface-sensitive coating applications. Here, preference is given to processing products having molecular weights of <3000 g/mol.

However, in the process of DE 102013212980, particularly in the case of producing polyphenylsiloxanes comprising polymethylsiloxane, problems arise with undesirable high molecular weights Mw>3000 g/mol.

SUMMARY OF THE INVENTION

The invention provides a continuous process for producing organopolysiloxanes having an OH content of 3.0-10.0% by weight,
in which alkoxysilanes in a proportion by weight of at least 60% and chlorosilanes in a proportion by weight of at most 40%, based on the sum total of chlorosilanes and alkoxysilanes, water and non-polar solvent, soluble to an extent of not more than 1 g in 1 l of water at 20° C. and 1 bar, are metered in continuously to the reaction mixture and that reaction mixture is continuously discharged.

DETAILED DESCRIPTION OF THE PREFERRED EMBODIMENTS

By the increased use of the alkoxysilanes in relation to the chlorosilanes, the continuous reaction proceeds smoothly and organopolysiloxanes are obtained having more uniform and relatively low molecular weights, especially molecular weights Mw<3000 g/mol.

In contrast to the known processes, the organopolysiloxanes having an OH content of 3.0-10.0% by weight are produced with very short residence times by the process according to the invention, even when omitting water-soluble polar solvents including alcohols. By virtue of the short residence times and relatively low amounts of alkoxysilanes, the formation of chloroalkanes from alcohol and HCl is suppressed and the amount of alcohol is reduced.

This also results in critical cost advantages compared to known continuous and discontinuous processes, since, in addition to the higher throughput due to low residence times, the complexity of the waste water treatment can be significantly reduced at the same time by virtue of low burdens of COD and POX.

A water phase and a solvent phase are formed; these are intimately mixed. Preference is given to metering in water in amounts such that an HCl concentration in the water phase of 5-35% by weight is established.

Preference is given to metering in the alkoxysilanes in a proportion by weight of 63% to 75%, in particular 65% to 70%, and the chlorosilanes in a proportion by weight of 37% to 25%, in particular 35% to 30%, based in each case on the sum total of chlorosilanes and alkoxysilanes.

The non-polar solvent is preferably soluble to an extent of not more than 0.5 g in 1 l of water at 20° C. and 1 bar. Examples of non-polar solvents are hydrocarbons such as pentane, n-hexane, mixtures of hexane isomers, heptane, octane, benzine, petroleum ether, benzene, toluene, xylenes. Particular preference is given to toluene and xylenes.

Polar solvents, which are not metered in, are in particular alcohols such as methanol and ethanol: ethers such as dioxane, tetrahydrofuran, diethyl ether, diisopropyl ether, diethylene glycol dimethyl ether; ketones such as acetone, methyl ethyl ketone, diisopropyl ketone, methyl isobutyl ketone (MIBK); esters such as ethyl acetate, butyl acetate, propyl propionate, ethyl butyrate, ethyl isobutyrate; carbon disulfide and nitrobenzene, or mixtures of these solvents.

The non-polar solvent is preferably supplied to the reaction mixture in amounts such that solids contents of 25-45% by weight are established. The solids content is the amount of organopolysiloxanes formed which are dissolved in the solvent phase.

The organopolysiloxane dissolved in the solvent phase is preferably separated continuously from the water phase. The organopolysiloxane is preferably freed from the solvent by distillation.

Chlorosilanes, alkoxysilanes, water and the non-polar solvent are preferably metered into the reaction mixture, and the reaction mixture is continuously discharged so that very short residence times of 1 minute to 30 minutes, preferably 2 minutes to 15 minutes are established.

Preferably, the organopolysiloxanes having an OH content of 3.0-10.0% by weight have the general formula I

$$R_nSiO_{4-n} \qquad (I),$$

in which
R is a OH, $C_1$-$C_{18}$-hydrocarbon radical or a $C_1$-$C_6$-alkoxy radical and
n denotes the values 0, 1, 2 or 3 and
n has average values of 1.0 to 2.0.

The OH content of the organopolysiloxanes refers to the OH groups bonded directly to silicon atoms. This content is preferably 3.0-8.0% by weight.
n preferably has average values of 1.4 to 1.8.

The organopolysiloxanes having an OH content of 3.0-10.0% by weight preferably have an average molecular weight Mw of 1500 to 3000, more preferably 1800 to 3000, and especially 2000 to 2900. The organopolysiloxanes preferably have a Tg (glass transition temperature) of 30° C. to 80° C., especially 35° C. to 75° C.

The halosilanes preferably have the general formula II

$$R^1{}_mSiCl_{4-m} \qquad (II),$$

in which
$R^1$ is a $C_1$-$C_{18}$-hydrocarbon radical and
m has the values 0, 1, 2 or 3.

The alkoxysilanes preferably have the general formula III

in which
$R^2$ is a $C_1$-$C_{18}$-hydrocarbon radical,
$R^3$ is a $C_1$-$C_6$-alkoxy radical and
o has the values 0, 1, 2 or 3.

The $C_1$-$C_{18}$-hydrocarbon radicals R, $R^1$ and $R^2$ are preferably $C_1$-$C_6$-alkyl radicals, especially methyl, ethyl or propyl radicals or phenyl radicals.

Preferred definitions of R correspond to the preferred definitions of $R^1$ and $R^2$.

The $C_1$-$C_6$-alkoxy radicals $R^3$ are preferably selected from methoxy and ethoxy radicals.

The reaction temperature is preferably 20° C. to 100° C., more preferably 40° C. to 80° C., and especially 50° C. to 70° C.

The reaction pressure is preferably 0.05 MPa to 1 MPa, more preferably 0.08 MPa to 0.2 MPa.

The reaction time is preferably 1 min to 5 h, more preferably 3 min to 3 h, and especially 5 min to 1.5 h.

All aforementioned symbols of the formulae above are each defined independently of one another. In all formulae the silicon atom is tetravalent.

Measurement Methods for Relevant Product Parameters
Molecular Compositions:

The molecular compositions are determined by nuclear magnetic resonance spectroscopy (for terminology, see ASTM E 386: High resolution nuclear magnetic resonance spectroscopy (NMR): Concepts and symbols), where the 1H nucleus and the $^{29}$Si nucleus are measured.

Description of 1H-NMR Measurement
Solvent: $CDCl_3$, 99.8% by weight D
Sample concentration: ca. 50 mg/1 ml $CDCl_3$ in 5 mm NMR tubes
Measurement without TMS addition, spectrum reference of residual $CHCl_3$ in $CDCl_3$ at 7.24 ppm
Spectrometer: Bruker Avance I 500 or Bruker Avance HD 500
Probe head: 5 mm BBO probe head or SMART probe head (Bruker)
Measurement Parameters:
Pulse program=zg30
TD=64 k
NS=64 or 128 (depending on the sensitivity of the probe head)
SW=20.6 ppm
AQ=3.17 s
D1=5 s
SFO1=500.13 MHz
O1=6.175 ppm
Processing Parameters:
SI=32 k
WDW=EM
LB=0.3 Hz Depending on the spectrometer type used, individual adjustments to the measurement parameters may be required.

Description of $^{29}$Si-NMR Measurement
Solvent: $C_6D_6$ 99.8% by weight D/$CCl_4$ 1:1 v/v with 1% by weight Cr(acac)$_3$ as a relaxation reagent
Sample concentration: ca. 2 g/1.5 ml of solvent in 10 mm NMR tubes
Spectrometer: Bruker Avance 300
Probe head: 10 mm 1H/13C/15N/29Si glass-free QNP probe head (Bruker)
Measurement Parameters:
Pulse program=zgig60
TD=64 k
NS=1024 (depending on the sensitivity of the probe head)
SW=200 ppm
AQ=2.75 s
D1=4 s
SFO1=300.13 MHz
O1=-50 ppm
Processing Parameters:
SI=64 k
WDW=EM
LB=0.3 Hz Depending on the spectrometer type, individual adjustments to the measurement parameters may be required.

Molecular Weight Distributions:

Molecular weight distributions are determined as weight average Mw and as number average Mn, wherein the method of gel permeation chromatography (GPC or size exclusion chromatography (SEC)) is used using polystyrene standard and refractive index detector (RI detector). Unless stated otherwise, THF is used as eluent, and DIN 55672-1 is followed. The polydispersity PD is the quotient Mw/Mn.

The OH content of the organopolysiloxanes is determined in accordance with Zerewitinoff.

In the following examples, unless stated otherwise in each case, all amounts and percentages are based on weight, all pressures 0.10 MPa (abs.) and all temperatures 20° C.

EXAMPLES

Examples 1 and 2 are produced in analogy to DE102013212980 and Examples 3 and 4 by the process according to the invention, each in a 300 liter loop (steel/enamel) with continuous downstream phase separation. In all examples, the crude product thus obtained is freed from solvent by distillation.

Description of Production of Non-Inventive
Examples 1 and 2 in Analogy to DE 102013212980

Example 1

22 kg/h of dimethyldichlorosilane, 335.2 kg/h of phenyltrichlorosilane and 204.8 kg/h of methyltriethoxysilane are fed into a loop together with 1400 kg/h of water and 900 kg/h of toluene in parallel through a mixing section. The following process parameters are set:
Residence time in minutes: 5-10
Reaction temperature ° C.: 60-65
HCl concentration in water phase: 10-15% by weight
Solids content (=resin dissolved in toluene): 25-30% by weight Example 2

22 kg/h of dimethyldichlorosilane, 335.2 kg/h of phenyltrichlorosilane and 210 kg/h of methyltriethoxysilane are fed into a loop together with 1400 kg/h of water and 900 kg/h of toluene in parallel through a mixing section. The following process parameters are set:
Residence time in minutes: 5-10
Reaction temperature ° C.: 60-65
HCl concentration in water phase: 10-15% by weight
Solids content (=resin dissolved in toluene): 25-30% by weight The molecular weights are reported in Table 1:

TABLE 1

| Example | Mw | Mn | PD | Chlorosilane % by weight | Alkoxysilane % by weight |
|---|---|---|---|---|---|
| 1 | 8100 | 2000 | 4.07 | 64 | 36 |
| 2 | 7700 | 2000 | 3.86 | 63 | 37 |

Description of Production of Examples 3 and 4 by the Processes According to the Invention Example 3

22 kg/h of dimethyldichlorosilane, 167.6 kg/h of phenyltrichlorosilane, 167.6 kg/h of phenyltriethoxysilane and 230 kg/h of methyltriethoxysilane are fed into a loop together with 800 kg/h of water and 850 kg/h of toluene in parallel through a mixing section.
The following process parameters are set:
Residence time in minutes: 5-10
Reaction temperature ° C.: 60-65
HCl concentration in the water phase: 10-15% by weight Example 4

22 kg/h of dimethyldichlorosilane, 167.6 kg/h of phenyltrichlorosilane, 167.6 kg/h of phenyltriethoxysilane and 204.8 kg/h of methyltriethoxysilane are fed into a loop together with 800 kg/h of water and 850 kg/h of toluene in parallel through a mixing section.
The following process parameters are set:
Residence time in minutes: 5-10
Reaction temperature ° C.: 60-65
HCl concentration in water phase: 10-15% by weight
Solids content (=resin dissolved in toluene): 25-30% by weight
The molecular weights are reported in Table 2:

TABLE 2

| Example | Mw | Mn | PD | Chlorosilane wt % | Alkoxysilane wt % |
|---|---|---|---|---|---|
| 3 | 2300 | 1300 | 1.86 | 32 | 68 |
| 4 | 2100 | 1200 | 1.72 | 34 | 66 |

The invention claimed is:

1. A continuous process for producing organopolysiloxanes having an OH content of 3.0-10.0% by weight, comprising:
continuously metering alkoxysilanes in a proportion by weight of at least 60% and chlorosilanes in a proportion by weight of at most 40%, based on the sum total of chlorosilanes and alkoxysilanes; water; and non-polar solvent, soluble to an extent of not more than 1 g in 1 l of water at 20° C. and 1 bar, to a reaction mixture, reacting to form an organopolysiloxane having an OH content of 3.0 to 10.0 wt. %, and continuously discharging the reaction mixture.

2. The continuous process of claim 1, wherein the alkoxysilanes, chlorosilanes, water and the non-polar solvent are metered in continuously to the reaction mixture in a loop reactor and the reaction mixture is discharged continuously from the loop reactor.

3. The continuous process of claim 1, wherein water is metered in in amounts such that an HCl concentration in the water phase of 5-35% by weight is established.

4. The process of claim 1, wherein the non-polar solvent comprises hydrocarbons.

5. The process of claim 1, wherein the non-polar solvent is fed to the reaction mixture in amounts such that a solids content of 25-45% by weight is established, wherein the solids content is the amount of organopolysiloxanes formed which is dissolved in the solvent phase.

6. The process of claim 1, wherein the organopolysiloxane dissolved in the solvent phase is separated continuously from the water phase.

7. The process of claim 1, wherein the organopolysiloxane has the formula I $$R_nSiO_{4-n} \qquad (I),$$

in which
R each independently is OH, a $C_1$-$C_{18}$-hydrocarbon radical or a $C_1$-$C_6$-alkoxy radical,
n is 0, 1, 2 or 3, and
n has an average value of from 1.0 to 2.0.

* * * * *